(12) United States Patent
Charas et al.

(10) Patent No.: US 6,400,937 B1
(45) Date of Patent: Jun. 4, 2002

(54) METHOD AND COMMUNICATIONS SYSTEM WITH AUTOMATIC REALLOCATION OF SUBSCRIBER UNITS

(75) Inventors: Philippe Charas, Upplands-Väsby; Sten Blomstergren, Täby, both of (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/268,643

(22) Filed: Mar. 16, 1999

Related U.S. Application Data (60) Provisional application No. 60/110,048, filed on Nov. 24, 1998.

(51) Int. Cl.$^7$ ................................................ H04Q 7/20
(52) U.S. Cl. ......................... 455/403; 455/436; 455/438
(58) Field of Search ................................ 455/437, 438, 455/439, 403, 432, 434, 436, 455

(56) References Cited

U.S. PATENT DOCUMENTS

| | | | |
|---|---|---|---|
| 5,303,240 A | * | 4/1994 | Borras et al. ............... 370/95.3 |
| 5,862,485 A | * | 1/1999 | Linneweh, Jr. et al. ...... 455/450 |
| 6,215,811 B1 | * | 10/2001 | Yuen ........................... 375/143 |

FOREIGN PATENT DOCUMENTS

| | | | | |
|---|---|---|---|---|
| EP | 0 788 284 A1 | * | 11/1996 | ............ H04Q/7/20 |
| EP | 0788 284 A | | 8/1997 | ............ H04Q/7/20 |
| WO | 97/09833 A | | 3/1997 | ............ H04Q/7/20 |
| WO | 97-09833 A | * | 3/1997 | ............ H04Q/7/20 |

* cited by examiner

*Primary Examiner*—Tracy Legree
*Assistant Examiner*—Miguel D. Green
(74) *Attorney, Agent, or Firm*—Burns, Doane, Swecker & Mathis, L.L.P.

(57) ABSTRACT

A radio local loop (RLL) system which can automatically reallocate fixed subscriber units to a different radio domain without expending the costly and time consuming efforts needed to manually readjust antennas. By transmitting a code to the fixed subscriber unit, whereby the code identifies a second radio domain, an antenna associated with the fixed subscriber unit automatically adjusts such that said subscriber unit can communicate with the second domain using a radio channel. While the scan angle of the antenna is adjusted, the fixed subscriber unit derives a signal quality value for a number of radio channels. Based on the signal quality values, the RLL system determines whether the second radio domain exhibits superior signal quality characteristics as compared to the first radio domain. If the second radio domain exhibits superior signal quality characteristics than the first radio domain, the fixed subscriber unit is reallocated to the second domain. Further, the fixed subscriber unit automatically performs a dynamic channel selection scheme. This scheme allows the fixed subscriber unit to select the available traffic channel that exhibits the best signal quality characteristics for establishing a connection.

5 Claims, 6 Drawing Sheets

| FREQUENCY CARRIER | TIME SLOT | RADIO STATION NO. | SIGNAL QUALITY |
|---|---|---|---|
| 1 | 1 | 1 | 0.1% BER |
| 1 | 2 | 1 | 0.08% BER |
| 1 | 3 | 1 | 0.11% BER |
| 1 | 4 | 1 | 0.13% BER |
| ⋮ | ⋮ | ⋮ | ⋮ |
| 10 | 12 | 2 | 0.1% BER |

FIG. 5

| FREQUENCY CARRIER | TIME SLOT | RADIO STATION NO. | SCAN ANGLE | RADIO DOMAIN | SIGNAL QUALITY |
|---|---|---|---|---|---|
| 1 | 1 | 74 | 1 | 72 | 0.1% BER |
| 1 | 2 | 74 | 1 | 72 | 0.08% BER |
| 1 | 3 | 74 | 1 | 72 | 0.11% BER |
| 1 | 4 | 74 | 1 | 72 | 0.13% BER |
| ⋮ | ⋮ | ⋮ | ⋮ | ⋮ | ⋮ |
| 10 | 12 | 88 | k | 84 | 0.1% BER |

METHOD AND COMMUNICATIONS SYSTEM WITH AUTOMATIC REALLOCATION OF SUBSCRIBER UNITS

This application claims priority to provisional application No. 60/110,048, filed Nov. 24, 1998.

BACKGROUND

1. Field of the Invention

The present invention relates to radio telecommunications systems, and more particularly, to radio local loop systems.

2. Brief Description of the Related Art

A radio local loop (RLL) system is a wireless telecommunications system, wherein fixed subscriber units or terminals communicate with the system over an air interface. Such radio systems are connected to private or public switched telephone networks and include a number of radio domains, each radio domain containing one or more radio stations (RS), or base stations. Each radio station controls the wireless communication links with any number of fixed subscriber units located in a corresponding geographical coverage area. A control unit for each radio domain stores and maintains a subscriber list containing the identification codes for each fixed subscriber unit assigned to that radio domain.

A fixed subscriber unit is typically either immobile or limited in its ability to be moved during operation (e.g., as is the case with a cordless telephone). All communication with the fixed subscriber unit is handled through the radio station servicing the corresponding coverage area in which the fixed subscriber unit is located. The fixed subscriber unit has a transceiver and an antenna for transmitting and receiving telecommunications data to and from the radio station via the air interface, over at least one pre-assigned radio channel, wherein a radio channel is defined by any number of different channel access schemes.

One such channel access scheme is known in the art as time division multiple access (TDMA). In a TDMA based system, such as a TDMA based RLL system, each of a number of frequency carriers is subdivided into a number of time slots. By subdividing each frequency carrier into multiple time slots, the traffic capacity of the system is substantially increased, as each of a number of fixed subscriber units are able to communicate over a single frequency carrier by limiting the time during which each transmits or receives data and control information to one or more assigned time slots.

A TDMA based system may further be characterized as either a time division duplex (TDD) system or a frequency division duplex (FDD) system. In a TDMA/FDD system, each frequency carrier is subdivided into time slots as described above. However, certain frequency carriers are dedicated to carrying downlink traffic (i.e., data and/or control information being transmitted from a radio station to a fixed subscriber unit), while other frequency carriers are dedicated to carrying uplink traffic (i.e,. data and/or control information being transmitted from a fixed subscriber unit to a corresponding radio station). In contrast, each frequency carrier in a TDMA/TDD based system handles both uplink and downlink traffic, such that approximately half of the time slots associated with a given frequency carrier are predesignated for carrying downlink traffic, while the remaining time slots associated with that frequency carrier are predesignated for carrying uplink traffic. A RLL system that employs the well-known Digital Enhanced Cordless Telecommunications (DECT) standard is an example of a TDMA/TDD based system.

In recent years, the demand for wireless radio communication services, and in particular, fixed radio communications services, has increased at an extraordinary rate. This is problematic because radio network resources are generally limited, thereby limiting both the geographic area that a system is capable of covering and limiting the amount of traffic (i.e., the traffic load) that a system is capable of handling. One way to address this problem is to construct new networks and/or to expand existing networks.

When the topology of a radio system is changed, such as adding new radio stations or radio domains to support increased traffic demand, the antennas at a number of fixed subscriber units must be adjusted or redirected towards the new radio station. In addition, the affected subscriber units must be reassigned to the new radio domain corresponding to the new radio station. This involves reallocating or re-registering each of the affected fixed subscriber units to the subscriber list maintained for the new radio domain, and removing each of these fixed subscriber units from the subscriber list associated with the radio domain in which they are currently allocated.

Presently, the addition of a new radio station or radio domain requires much effort, including the manual adjustment and reallocation of the affected subscriber units. And, as one skilled in the art will readily appreciate, this is extremely expensive, particularly if the RLL system is constantly undergoing network reconfiguration and/or network expansion to include the addition of new radio domains. Accordingly, in a fixed RLL system, it would be desirable to have a method and communication system that can automatically reallocate a subscriber unit to a different radio domain but without the need to perform complex reallocation and/or readjustment procedures, or the expense associated therewith.

SUMMARY

The present invention generally relates to a method and communications system that automatically reallocates subscriber units in a RLL system when the radio system topology is changed, without expending the costly and time consuming efforts needed to manually readjust antennas.

In accordance with one aspect of the present invention, the RLL system can automatically redirect a fixed subscriber unit, particularly the antenna associated with the fixed subscriber unit, so that it transmits and receives through a traffic channel associated with a different radio domain. In a preferred embodiment, the fixed subscriber unit maintains a traffic channel register that identifies the time slot, frequency, radio station number, scan angle, and radio domain through which the fixed subscriber unit is to communicate. By transmitting an identification code of a second radio domain, thereby changing the radio domain value, an operator can directly or remotely reassign the fixed subscriber unit to the second radio domain. A control unit associated with the second radio domain will store information in its subscriber list concerning the reassigned fixed subscriber unit while the control unit of the first domain removes such information.

In accordance with another aspect of the present invention, the RLL system can begin reallocating a fixed subscriber unit from a first radio domain to a second radio domain by sending a code identifying the second radio domain to the fixed subscriber unit. In response to receiving the code, an antenna associated with the fixed subscriber unit is directed towards the second radio domain. While varying the antenna scan angle, the fixed subscriber unit determines a signal quality value for each communication channel, wherein the channel is defined by a frequency, a time slot, a radio station, a radio domain, and an antenna scan angle. If at least one communication channel in the second radio domain exhibits superior signal quality values than communication channels in the first radio domain, then the fixed subscriber unit is reallocated to the second radio domain.

The present invention provides advantages over the prior art. First, when the radio system topology is changed, a fixed subscriber unit can be easily adjusted or redirected by transmitting a different radio domain value. Second, using an improved method for dynamic channel selection, the fixed subscriber unit will automatically adjust itself to a radio channel based on the registered signal quality factor. Thus, fixed subscriber units can be automatically reallocated to different radio domains without expending the costly and time consuming efforts needed to manually readjust each antenna.

BRIEF DESCRIPTION OF THE DRAWINGS

The present invention will now be described in greater detail with reference to the accompanying drawings, in which like elements bear like reference numerals, and wherein.

DETAILED DESCRIPTION OF THE PREFERRED EMBODIMENTS

Figure 1:
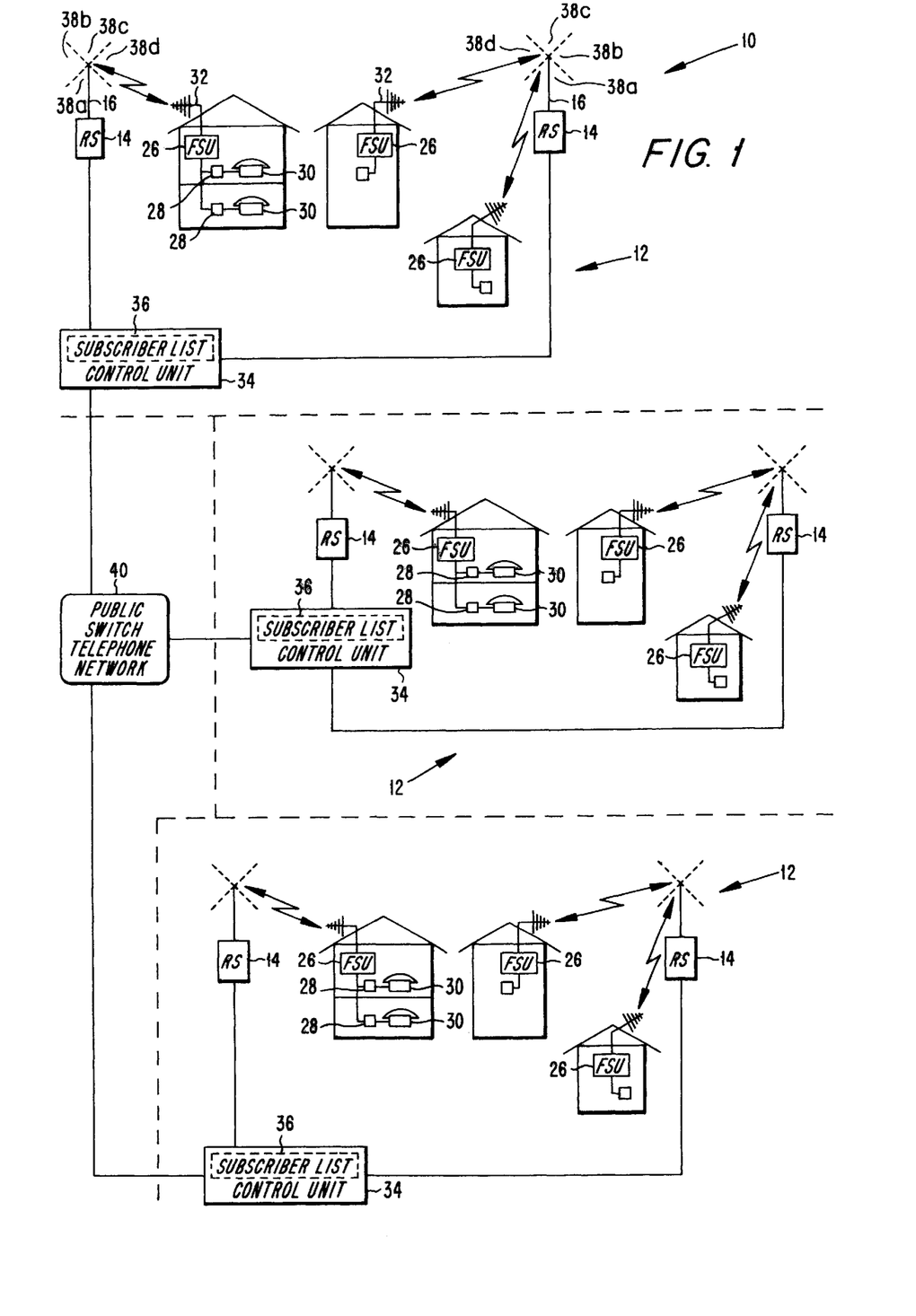
FIG. 1 illustrates a radio local loop system.

FIG. 1 illustrates the configuration of a typical radio local loop (RLL) system 10. As shown in FIG. 1, the coverage area associated with the RLL system 10 is divided into smaller, adjoining geographical areas, herein referred to as radio domains 12. FIG. 1 also illustrates that each radio domain 12 contains a control unit 34, wherein the control unit connects the corresponding radio domain with a public switch telephone network 40. In addition, the control unit 34 maintains, among other things, a subscriber list 36, which identifies all of the fixed subscriber units (FSU) assigned to the corresponding radio domain 12. Each radio domain 12 also includes one or more radio stations 14 which are linked to the control unit 34, typically over a wireline connection, and linked to a plurality of FSUs 26 over a wireless or air interface. Although the RLL system 10 is illustrated as including three radio domains 12, each of which, in turn, contain two radio stations 14, it will be understood that the RLL system may include more than or fewer than three radio domains, while each radio domain 12 may contain more than two radio stations or as few as one radio station.

Each FSU 26, as stated above, communicates with a corresponding radio station 14 over a wireless interface. Accordingly, each FSU 26 has one or more transmit and receive antennas 32 which, in accordance with conventional practice, have been manually installed and/or adjusted so that they effectively point in the general direction of the corresponding radio station 14. The radio station 14 has a plurality of antennas 16 which point radially outward and define a plurality of sectors 38a–d which face different directions. During a call, the FSU 26 communicates with a radio station 14 through a sector 38.

In addition, each FSU 26 is associated with one or more communication devices, for example, cordless telephones 30, which are connected to the FSU via a socket 28. However, it will be understood by those skilled in the art that the communication devices may include devices other than cordless telephones, such as computer terminals, fax machines and the like.

Figure 2:
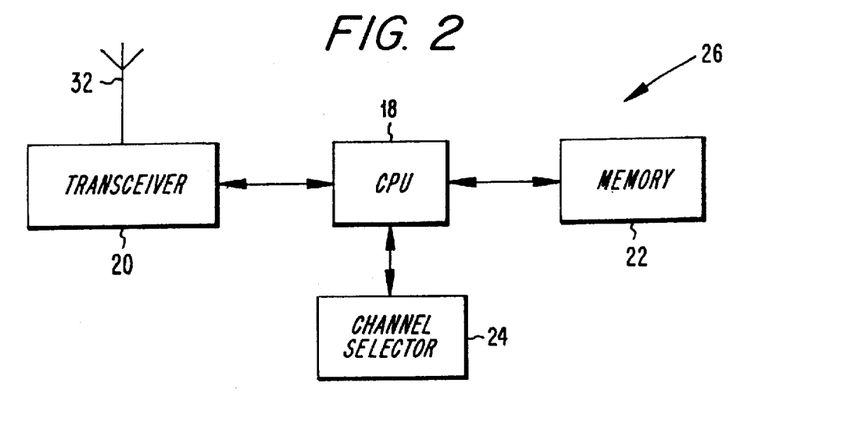
FIG. 2 is a block diagram of a fixed subscriber unit according to an exemplary embodiment of the present invention.

FIG. 2 depicts the basic components in a typical FSU 26. As shown in FIG. 2, a typical FSU includes, among other features, a transceiver 20, a CPU 18, a memory 22 and a channel selector 24, the functions of which will be described in greater detail below.

Figure 3:
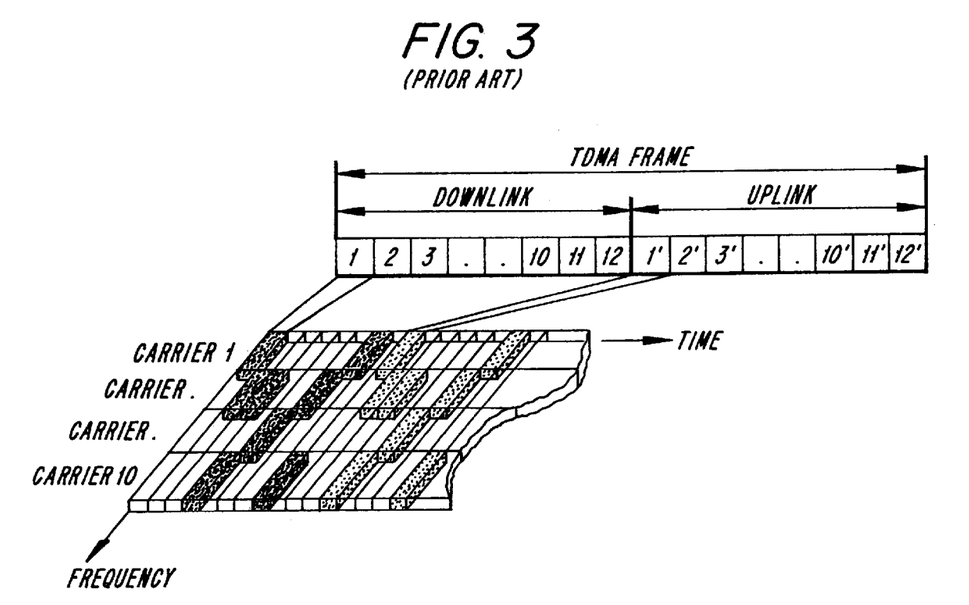
FIG. 3 illustrates a DECT frame structure.

In order for a FSU 26 and a corresponding radio station 14 to communicate with one another over a wireless interface, a channel access scheme is required, such as the exemplary TDMA/TDD channel access scheme illustrated in FIG. 3. As illustrated in FIG. 3, the exemplary TDMA/TDD channel access scheme has ten frequency carriers, wherein each of the ten frequency carriers is divided into time frames, and wherein each time frame is further divided into a number of time slots, for example, 24 time slots. As the channel access scheme in FIG. 3 is a TDD based scheme, one skilled in the art will appreciate that half, or approximately half, of the time slots (e.g., 12 time slots) associated with each of the ten frequency carriers are set aside for downlink (i.e., from radio station to terminal) communications, while the remaining time slots associated with each of the ten frequency carriers are set aside for uplink (i.e., from terminal to radio station) communications.

In general, the ten frequency carriers are divided amongst the radio stations 14 in each radio domain 12. For example, if the radio domain 12 has two radio stations 14, the first radio station may be assigned frequency carriers 1–5 for use in communicating with a number of corresponding FSUs, while the second radio station may be assigned frequency carriers 6–10. Each of the various FSUs then receive data and/or control information from a corresponding radio station 14 during an assigned downlink time slot and transmit data and/or control information to the corresponding radio station 14 during an assigned uplink time slot associated with one of the frequency carriers assigned to that radio station 14. It will be understood, however, that if the traffic load is relatively low, a FSU may be permitted to communicate with the corresponding radio station 14 over more than one frequency carrier and/or more than one uplink and downlink time slot. Accordingly, the communications channel linking a particular FSU and a particular radio station 14 is defined by: i) an identifier code that uniquely identifies the radio station 14 through which the FSU is communicating, ii) a frequency carrier assigned to that radio station 14 over which the FSU is communicating, and iii) a downlink and an uplink time slot associated with that frequency carrier during which the FSU is communicating. The exemplary TDMA/TDD channel access scheme depicted in FIG. 3 is well known in the art.

When a connection is first established between a FSU 26 and the RLL system, it is preferable that the channel or channels exhibiting the best possible signal quality characteristics be assigned to support that connection. Of course, the same is true for existing connections as well. To help ensure that the channel or channels exhibiting the best possible signal quality characteristics are assigned to support new or existing connections, the CPU 18 in each FSU 26 will be capable of continuously deriving a signal quality factor for each channel, wherein the signal quality factor may, for example, be derived as a function of one or more link parameters such as carrier-to-interference ratio (C/I), bit error rate (BER), frame erasure rate (FER), radio signal strength indicator (RSSI), or a combination thereof. Further, the values associated with the one or more link parameters are measured by the FSU 26 during those periods of time where the FSU 26 is not transmitting or receiving data and/or control information.

Figure 4:
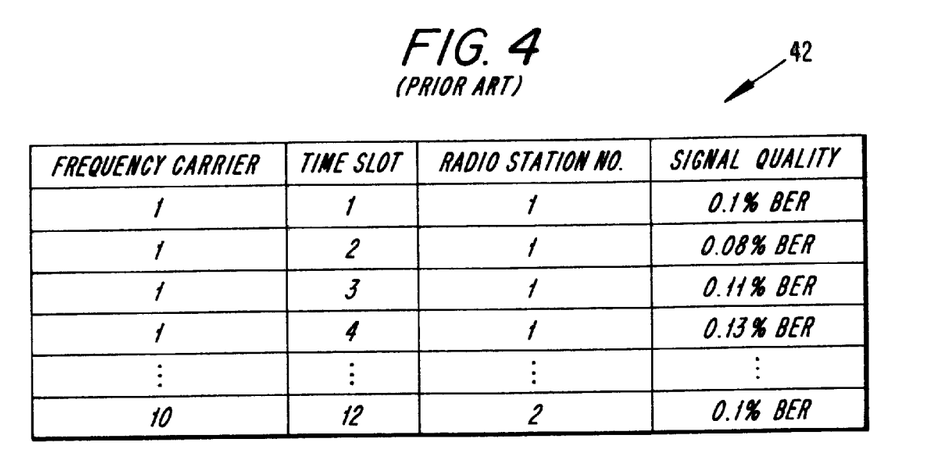
FIG. 4 illustrates stored data in a fixed subscriber unit.

Once derived, the signal quality factors can be stored in the memory 22, for example, in tabular form as illustrated in FIG. 4. Then by continuously updating the signal quality factor values stored in the memory 22, the channel selector 24 in the FSU 26 can dynamically select the channel or channels exhibiting the best signal quality characteristics when a connection is first established or during an existing connection, if the signal quality associated with the channel or channels supporting the existing connection degrade below an acceptable level.

In copending U.S. patent application Ser. No. 09/268,644, which is assigned to the same assignee as the present application, an improvement in the way RLL systems accomplish dynamic channel selection is described. In this copending application, which is incorporated by reference herein, the principle of dynamic channel selection is extended by taking into consideration the FSU antenna scan angle during the dynamic channel selection process, where scan angle is defined as the direction in which the peak radio frequency energy is being transmitted and received relative to a reference direction.

The present invention further extends the concept of dynamic channel selection, as described in the above-identified copending U.S. patent application. More particularly, the present invention extends the concept of dynamic channel selection by taking into consideration both the FSU antenna scan angle and the radio station sector to facilitate the process of automatically reallocating FSUs when the RLL system is expanded. While the present invention is primarily intended to be implemented in a fixed RLL system, it should not be limited thereto.

Figure 7A:
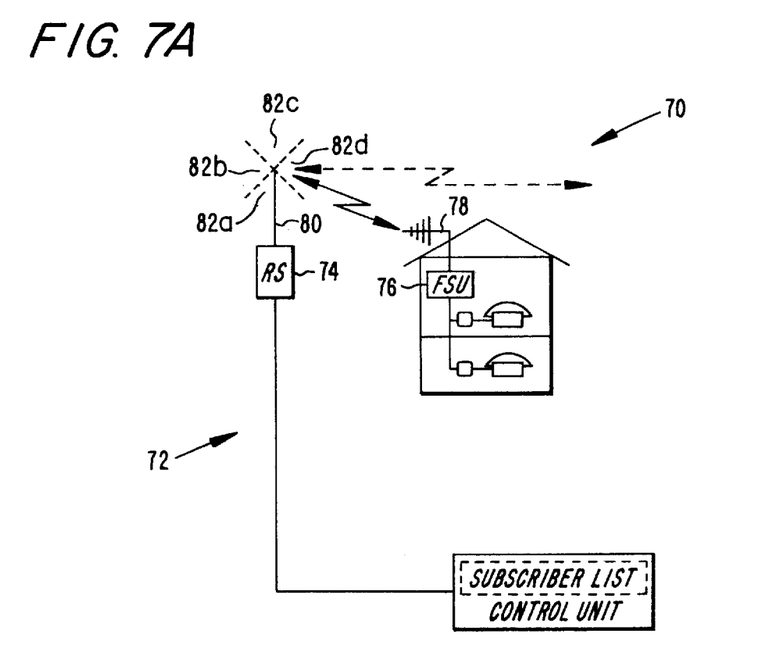
FIG. 7A illustrates a radio local loop system, prior to expansion of the network.

FIG. 7A shows a RLL system 70, or a portion thereof, prior to expansion. As shown, the RLL system 70 includes one radio domain 72 which contains one radio station 74 to serve the FSU 76. The FSU 76 has an antenna 78 which transmits and receives signals between the FSU 76 and one or more antennas 80 located at the radio station 74, wherein each of the one or more antennas 80 is associated with a corresponding radio station sector 82a–d.

Figure 7B:
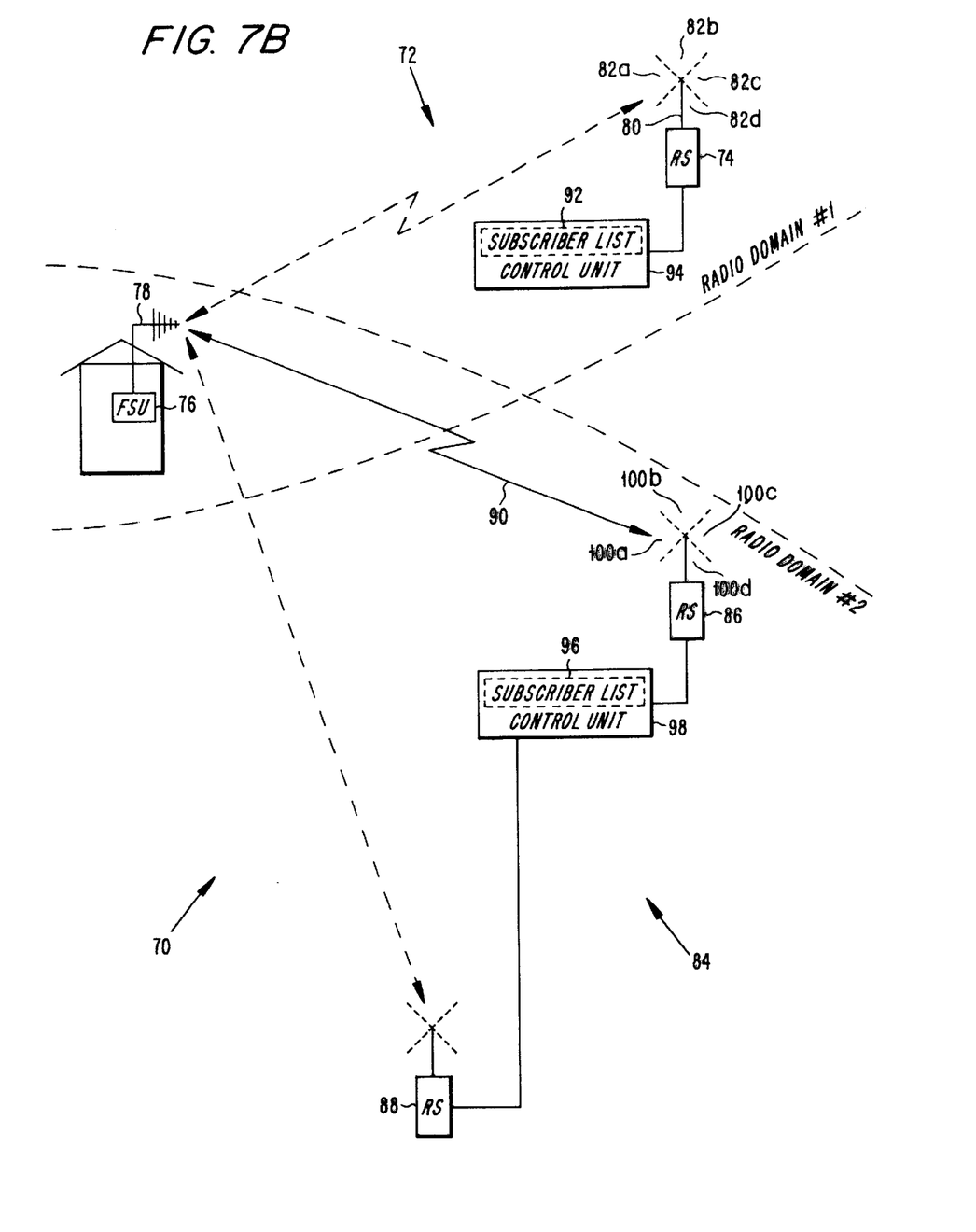
FIG. 7B illustrates the radio local loop system of FIG. 7A after expansion of the network.

FIG. 7B, in contrast, illustrates the RLL system 70 of FIG. 7A after expansion. As shown, the RLL system 70 now includes a new radio domain 84 which contains two new radio stations 86 and 88. Expansion may be become necessary when the number of FSUs becomes too large given the number of radio domains and radio stations. Accordingly, the addition of new radio domains and radio stations are needed to accommodate all of the FSUs and the resulting traffic capacity. Of course, when the RLL system 70 is expanded, a certain number of FSUs, for example FSU 76, may be reallocated to the new radio domain 84, if doing so will result in better quality of service for the FSU.

Figure 5:
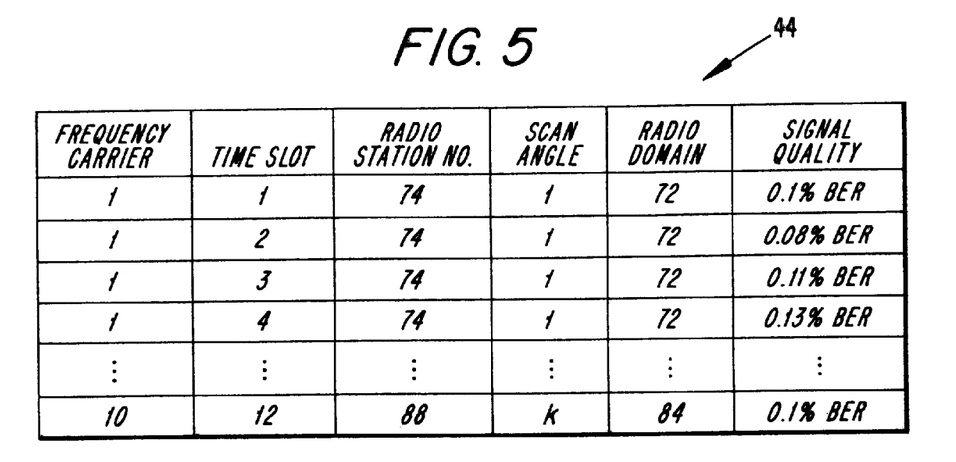
FIG. 5 illustrates stored data in a fixed subscriber unit, wherein the stored data includes frequency, time slot, radio station number, scan angle, and radio domain.

In accordance with an exemplary embodiment of the present invention, the CPU 18 in each FSU, for example, FSU 76, continuously derives a signal quality factor for each potential communications channel, where a communications channel linking the FSU 76 and a particular radio station, such as radio station 74, 86 or 88, is now defined by: i) an identifier code that uniquely identifies the radio station, ii) a frequency carrier, iii) a downlink and an uplink time slot associated with that frequency carrier, iv) the scan angle of the FSU antenna 80, and v) the radio domain 72 and 84. The signal quality factor values measured for each channel may be stored in the memory 22, for example, in tabular form as illustrated in FIG. 5. Appropriately, the table in FIG. 5 contains one or more signal quality factor values for each frequency carrier, time slot, radio station and antenna scan angle combination, in each radio domain. By repeatedly updating the signal quality factor values for each channel, a dynamic picture of the radio-frequency environment surrounding the FSU 76 is continuously maintained.

Figure 6:
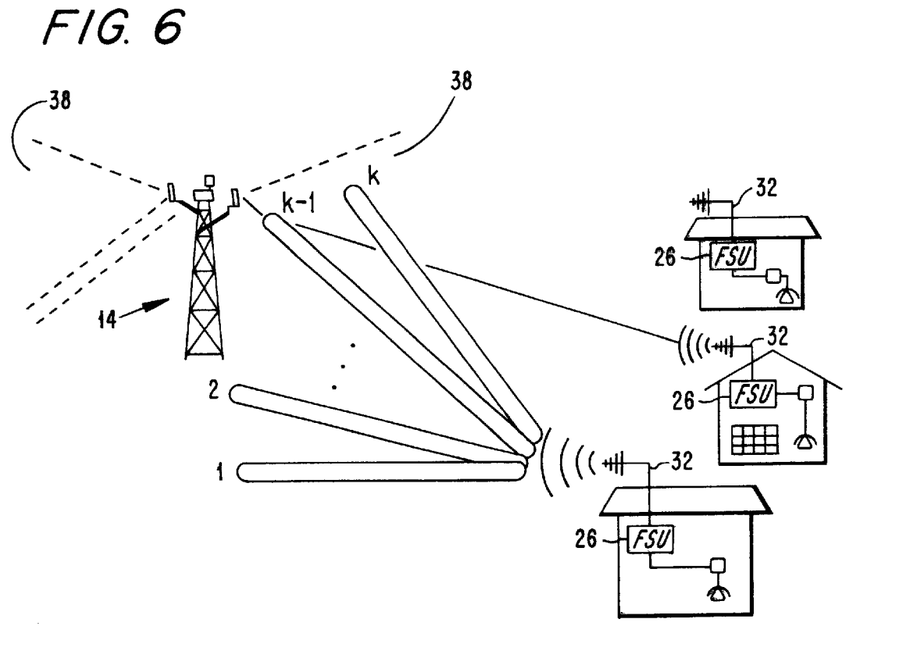
FIG. 6 illustrates "k" different scan angles for a directional antenna associated with a fixed subscriber unit.

In order to derive a signal quality factor for each channel, that is, each frequency carrier, time slot, radio station, radio domain and antenna scan angle combination, in accordance with a preferred embodiment of the present invention, the FSU antenna 80 is automatically swept through k different scan angles, as illustrated in FIG. 6. As the antenna is swept through each of the k different scan angles, the FSU 76 measures the value of one or more link parameters such as BER, FER, C/I, RSSI or the like, and therefrom, derives a signal quality factor for each channel. The signal quality factor values are then stored in the memory 22 and repeatedly updated, for example, 500 times per second, thereby creating a more accurate, dynamic picture of the radio frequency environment surrounding the FSU 76. In doing so, the FSU 76 can be dynamically reallocated to a new radio domain during system expansion.

As mentioned, the antenna 80 is automatically swept through the k different scan angles. This may be accomplished by mechanically sweeping a rotatable antenna to each of the k different scan angles, by electronically sweeping a phased-array antenna to each of the k different scan angles, or by selecting each one of a number of fixed directional antennas, wherein the boresight associated with each directional antenna is coincident with each of the k different scan angles. However, regardless of whether the automatic redirection of antenna scan angle is accomplished mechanically, electronically or through the selection of a number of directional antennas, it will be understood that the process of automatically sweeping through the k different scan angles, measuring the one or more link parameters, and deriving a signal quality factor for each channel can be controlled through a dynamic channel selection algorithm resident in, for example, the memory 22.

If after system expansion, the FSU 76 determines, through the dynamic channel allocation process, that the signal quality associated with the communications channels corresponding to the one or more radio stations 86 or 88 in the new radio domain 84 are superior to the signal quality characteristics associated with the communications channels corresponding to the radio station 74 in radio domain 72, an automatic FSU allocation procedure will be initiated. FIG. 7B depicts the FSU 76 being reallocated to radio domain 84, through radio station 86, as indicated by the solid line 90, after the FSU 76 has compared the signal quality factors associated with those communications channels corresponding to radio stations 74, 86, and 88. The radio station 86 then, in turn, automatically selects the appropriate radio station sector through which the FSU 76 will communicate during a call, for example, radio station sector 100a. The identification code of the FSU 76 is then stored in the subscriber list 96 maintained in the control unit 98 of the new radio domain 84.

Figure 8:
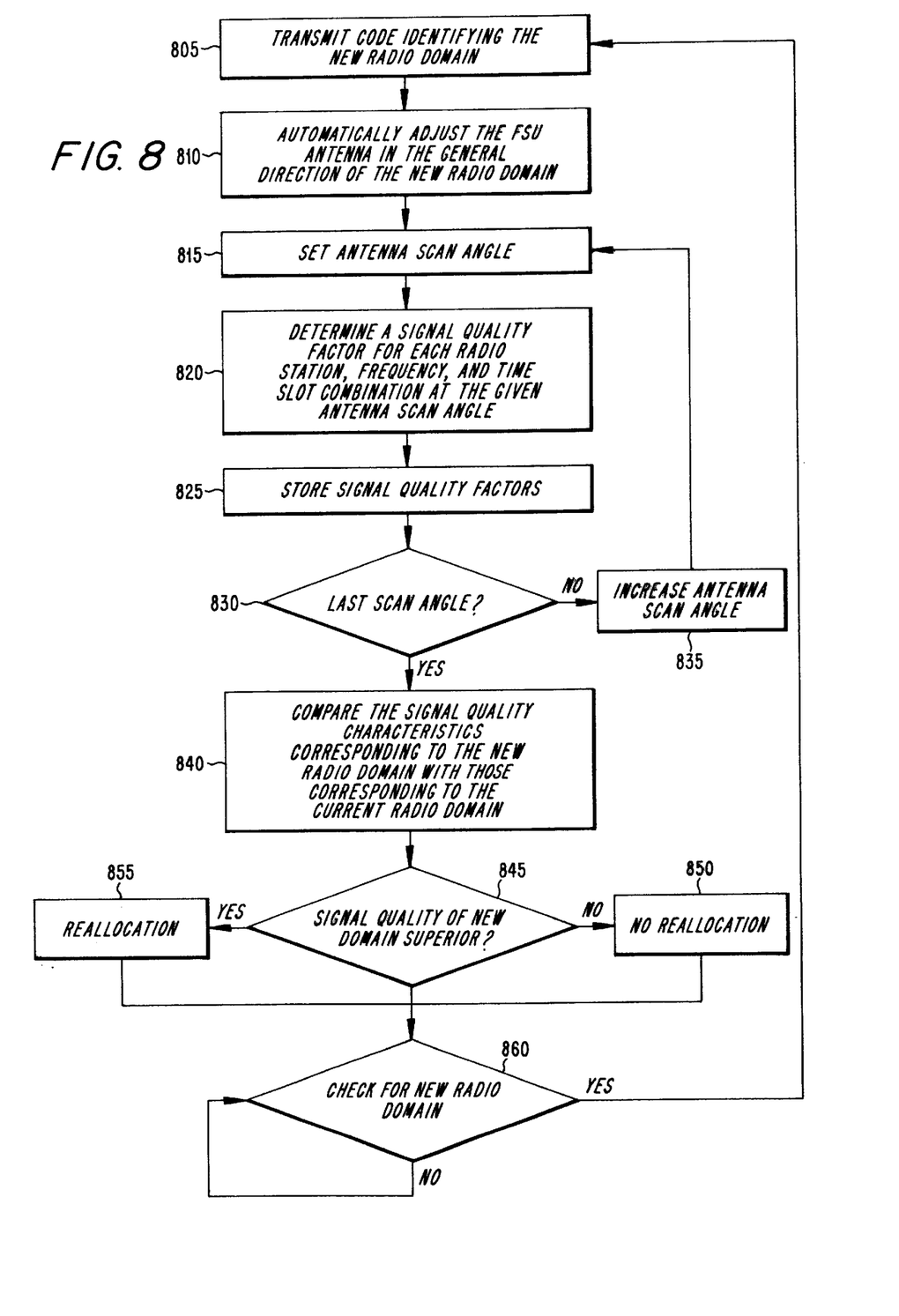
FIG. 8 is a flowchart showing one embodiment of the method of reallocating subscriber units according to the present invention.

FIG. 8 shows the steps of an exemplary embodiment of the automatic reallocation of a FSU 76 to a new radio domain 84, as it relates to FIG. 7B. The block 805 indicates that the operator transmits an identification code associated with the new radio domain 84 to the FSU 76, wherein the identification code includes geographical location information which indicates to the FSU the direction of the new domain.

Next at block 810, the FSU 76 automatically adjusts the antenna 78 in the general direction of the second radio domain 84. In performing these adjustments, the antenna 78 is swept through k different scan angles, either mechanically or electronically, and simultaneously transmits to and receives signals from the radio stations 86, 88 serving that domain. The block 815 indicates that the FSU 76 sets the value of the scan angle "k" of the antenna 78 in its traffic channel register 44. Then the FSU at block 820 measures the value of one or more link parameters, such as C/I, BER, FER, and RSSI at each possible frequency, time slot, and radio station combination at the given scan angle and derives a signal quality factor for each communication channel based on the link parameter values. The step at block 820 is performed in accordance with the dynamic channel selection techniques described in copending U.S. patent application Ser. No. 09/268,644. Next at block 825, the FSU 76 can store the signal quality factors in the memory 22, as depicted in FIG. 5.

At decision block 830, it is determined whether or not the antenna 78 has redirected itself through all of the k different scan angles. If so, the flow moves to block 840 where the FSU 76 compares the signal quality factors corresponding to the second radio domain 84 with those of the first radio domain 72, stored in the traffic channel register 44. Otherwise, the flow moves to block 835, wherein the FSU 76 incrementally increases the antenna scan angle. The flow then loops back to block 815 where the FSU 76 sets the value of the antenna scan angle in the traffic channel register 44 and continues to measure received signals from radio stations 86, 88 serving that second radio domain 84.

Having compared the signal quality factors of the first and second radio domains 72 and 84, the flow proceeds to decision block 845. Here the FSU 76 determines whether the signal quality characteristics corresponding to the second radio domain 84 are superior to those corresponding to the first radio domain 72. In one embodiment of the invention, the FSU 76 will make this determination if it identifies at least one communication channel between the FSU and a radio station 86, 88 within the second radio domain 84 exhibiting superior signal quality characteristics. In an alternative embodiment of the invention, the FSU 76 uses a statistical analysis procedure based on the signal quality factors for each communication channel and determines whether the signal quality characteristics of the second radio domain 84 are superior to those corresponding to the first radio domain 72.

If so, the flow moves to block 855, and the FSU 76 is reallocated to the second radio domain 84 whereby the identification code of the FSU is added to a subscriber list 96 associated with the second radio domain and maintained at the corresponding central unit 98. Further, the control unit 94 associated with the first radio domain 72 will remove the identification code of the FSU 76 from the subscriber list 92. In an alternative embodiment of the present invention, the control unit 94 associated with the first radio domain 72 will alter the subscriber list 92 to indicate that the FSU 76 is inactive with respect to the first radio domain.

If the answer to this determination at decision block 845 is no, then the flow moves to block 850 and no reallocation of the FSU 76 to the second radio domain 84 is made. Accordingly, the FSU 76 transmits a signal to the operator indicating that it is not ready to accept a reallocation to the second radio domain 84. The second control unit 98 will then flag the identification code of the FSU 76 as being inactive in the subscriber list 96. The flow then proceeds to decision block 860.

Since the topology of the RLL system may change by adding one or more radio domains, at decision block 860, it is determined whether or not the FSU 76 must check for other new radio domains. If so, the flow loops back to block 805 wherein the operator transmits an identification code associated with the other new radio domain (not shown) to the FSU 76. If the answer to this determination is no, then the flow loops back to decision block 860, and the FSU 76 continues to check for additional, new radio domains.

The present invention concerns a method and communication system for automatically reallocating subscriber units when the radio system topology is changed. This invention provides the advantages of automatic reallocation of terminals to radio domains without expending the costly and time consuming efforts needed to manually readjust each antenna. While the invention has been described in detail with reference to the preferred embodiments thereof, it will be apparent to one skilled in the art that various changes and modifications can be made and equivalents employed, without departing from the present invention.

What is claimed is:

1. In a fixed radio communication system, a method of automatically reallocating a terminal located in a first radio domain to a second radio domain comprising the steps of:

transmitting a first code to the terminal, wherein the first code uniquely identifies the second radio domain;

in response to the first code, directing an antenna associated with the terminal in the direction corresponding to the second radio domain;

adding a second code that uniquely identifies the terminal to a subscriber list associated with the second radio domains;

deriving one or more signal quality factor values for each of a plurality of communications channels associated with the second radio domain;

comparing the signal quality factor values corresponding to the second radio domain with signal quality factor values corresponding to the first radio domain;

determining whether the signal quality factor values associated with the second domain are better than the signal quality factor values associated with the first radio domain; and if the signal quality factor values associated with the second domain are superior to the signal quality factor values associated with the first radio domain, then initiating a reallocation of the terminal from the first radio domain to the second radio domain, alternatively, if the signal quality factor values associated with the second radio domain are not superior to the signal quality factor values associated with the first radio domain, then transmitting a signal from the terminal indicating that said terminal will not reallocate from the first radio domain to the second radio domain.

2. The method of claim 1, further comprising the step of:

removing the second code that uniquely identifies the terminal from a subscriber list associated with the first radio domain.

3. The method of claim 1, further comprising the step of:

altering a subscriber list associated with the first radio domain so that the subscriber list associated with the first radio domain indicates that the terminal is inactive with respect to the first radio domain.

4. The method of claim 1, wherein said step of directing an antenna associated with the terminal in a direction corresponding to the second radio domain comprises the step of:

redirecting radio frequency energy toward the second radio domain.

5. The method of claim 1, wherein each of the plurality of communications channels associated with the second radio domain is defined by a frequency carrier, a time slot, a radio station, a radio domain and an antenna scan angle.

* * * * *